July 27, 1926.
D. D. HUBBELL
MULTIFOCAL LENS AND METHOD OF MAKING THE SAME
Filed Sept. 27, 1924
1,594,059
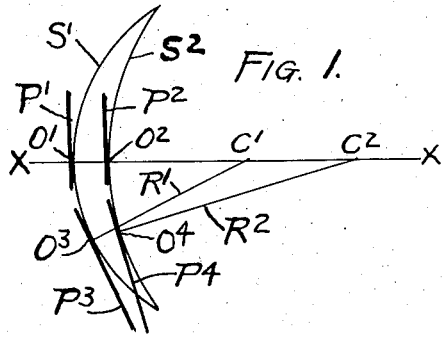
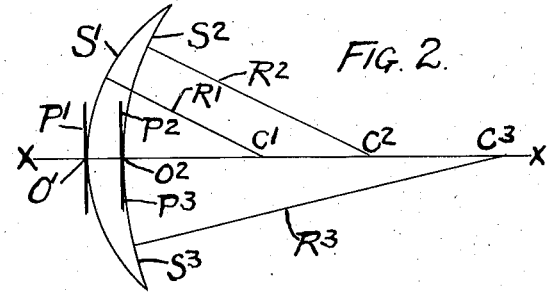
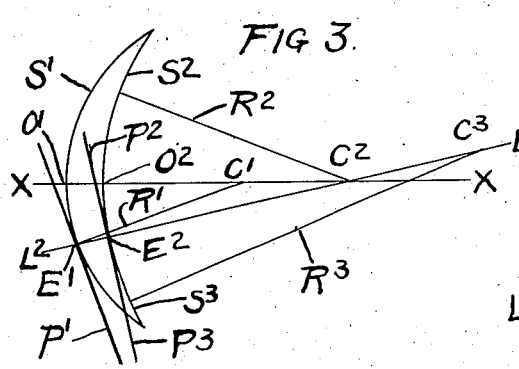
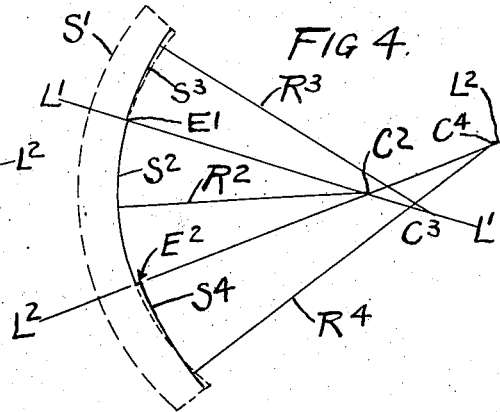
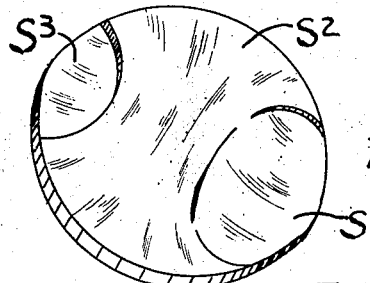
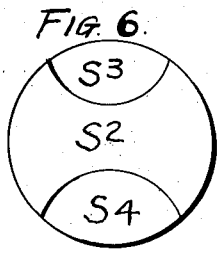
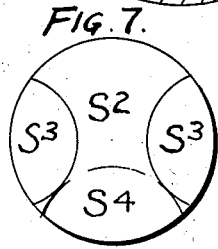
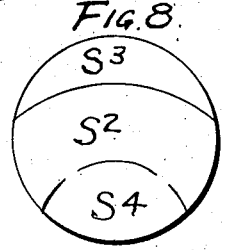
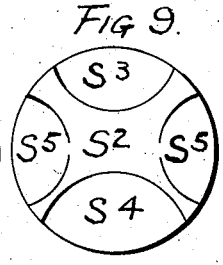
DANIEL D. HUBBELL, INVENTOR.
BY
ATTORNEYS.

Patented July 27, 1926.

1,594,059

UNITED STATES PATENT OFFICE.

DANIEL D. HUBBELL, OF COLUMBUS, OHIO.

MULTIFOCAL LENS AND METHOD OF MAKING THE SAME.

Application filed September 27, 1924. Serial No. 740,390.

My invention relates to multifocal lenses and methods of making the same. It has to do primarily with the making of multifocal lenses embodying more than two lenticular portions, although it embodies some features of advantage in lenses having but two lenticular portions.

In the past, the art has held that a multifocal lens which is to be free from prismatic disturbance as the vision enters or leaves a lenticular portion must either have the principal axes of such lenticular portions coincident or must have a major lens member with minor negative lenticular members superimposed thereon or upon each other, with their principal axes at the points of entrance or emergence of the vision onto or from such other lens member.

The first of these two principles cannot be extended in a practical manner to multifocal lenses with more than two lenticular portions, and even in a bifocal lens the principal axis of the two lens portions must lie on the line of demarcation between the two portions when it is often desirable that the principal axis be otherwise disposed.

The second of these two principles is also impractical and no one has ever shown the art how it can be embodied in a concave-convex, one-piece lens, which is practically the only type of multifocal lens saleable today.

I have given exhaustive research to this problem and have devised a method whereby a one-piece multifocal lens can be made that will merge the image and thereby avoid prismatic disturbance as the vision passes normally from any lenticular portion to any other lenticular portion, regardless of the number or relative location of the lenticular portions. My invention further contemplates the use of such a method that a one-piece lens can be made in more sightly and more substantial form and with such ridges, as may be necessary, minimized to the greatest possible degree.

More specifically, I have devised a method of grinding a semi-finished multifocal lens blank which eliminates the necessity of consideration of the anterior surface, for example, on a convex-concave lens and concerns itself merely with the making of the posterior surfaces of such location and dioptric value that the image of an object at the normal point of entrance or emergence from any lenticular portion is seen through a point common to two lenticular surfaces and is merged so as to produce but one image when the anterior surface is finished, regardless of the character of such anterior surface or its angular relationship to any of the posterior surfaces.

In other words, by using my invention the optical axis of any one of the distance, reading or utility portions may be located at any desired position without regard to the location of the optical axis of any other of such portions, for the merging of the image is solely determined by the relation of the adjacent posterior curves. Thus I produce a lens wherein the image merges when the vision passes from one lenticular portion to another due to the fact that the point where the vision emerges from one lenticular portion is in a plane parallel to or coincident with a plane through the adjacent point where the vision enters the adjacent lenticular portion and independent of the optical axes of either of the portions.

To facilitate this description, the point where the vision normally passes from one lenticular portion to another in the normal movement of the eye to accommodate itself to the use of such lenticular portions are each hereafter referred to as the "entrance point."

The merging of the image is made possible because I produce the minor lenticular portions, preferably, by grinding posterior or concave surfaces wherein each pair of adjacent curves have their centers in the same straight line, which line also passes through the entrance point of the two surfaces or through a point adjacent thereto. The result is that I can make a multifocal lens of one piece in which the principal axes of any two adjacent lenticular portions may or may not be coincident and yet, regardless of this fact, the vision may enter or leave a lenticular portion along a normal line without prismatic disturbance, such as a "jump" of the image or an apparent doubling of the object.

It is also important to note that I can do this in a convex-concave lens by making the multifocal surfaces of either convex or concave form, although I have shown the lens as preferably made with concave multifocal surfaces.

I can also make a lens which merges the image and wherein the various portions may be separated from each other by any desired space and so located on the surface of the lens as to be most convenient to the wearer in the pursuit of his work or pleasure, regardless entirely of the dioptric values that may be given the various lenticular surfaces. I prefer to call such lenticular portions as are not used for distance or reading, utility portions.

It is within the scope of my invention to locate the line containing the centers of adjacent surfaces not only through the common point of entrance but adjacent thereto in order that the eye may find a greater or less area in one of the lenticular portions wherein it may function without encountering prismatic disturbance. It will be understood that this area may be greater where the difference in dioptric values or adjacent surfaces is relatively small and vice versa.

Other objects and advantages of my invention are apparent by reference to the following specification taken in connection with the accompanying drawings forming a part thereof. It will be understood that I may modify the specific details shown and described within the accompanying claims without departing from or exceeding the spirit of my invention.

Figure 1 shows the optical relations existing in various portions of a simple lens.

Figure 2 shows the optical relation existing at the entrance point of a monocentric bifocal of the prior art.

Figure 3 shows the optical relation existing at the entrance point of a bifocal lens embodying my invention.

Figure 4 shows a vertical section of a lens blank suitable for a trifocal lens embodying my invention.

Figure 5 is a perspective view of my lens looking downwardly on the upper and lower utility portions.

Figures 6, 7, 8, 9 show lenses of my construction with various locations and shapes of the different lenticular portions indicated thereon.

In the drawings I have used the symbol $S^1$ to represent the surface opposite that on which the multifocal surfaces are disposed, while the symbols $S^2$, $S^3$ and $S^4$ represent the multifocal surfaces of different dioptric values arranged on the same side of the lens. Furthermore, I have represented the radii of curvature of the said surfaces, respectively, by the symbols $R^1$, $R^2$, $R^3$ and $R^4$, the centers of curvature of such surfaces being respectively designated $C^1$, $C^2$, $C^3$ and $C^4$.

XX is a line representing the principal axis of a lens considered as a whole, while the loci of centers of adjacent curved surfaces are designated $L^1 L^1$ and $L^2 L^2$.

$P^1$, $P^2$, et cetera, represent planes which are respectively tangent to the above-mentioned surfaces. $O^1$, $O^2$, et cetera, represent points where the principal axis pierces the surfaces $S^1$, $S^2$, et cetera, whereas $E^1$ and $E^2$ represent the entrance points where the line of vision normally passes the line of demarcation between adjacent surfaces.

Wherever possible, I have used the initial letters of the appropriate terms as designating symbols, together with a numeral indicating the particular lens surface to which the symbol applies. Thus $S^1$ for the surface of the anterior surface, $R^2$ for the radius of the posterior surface, $S^2$ et cetera.

Referring to Figure 1, the surfaces $S^1$ and $S^2$ have their centers at $C^1$ and $C^2$ respectively with radii $R^1$ and $R^2$ respectively. These surfaces represent the limiting surfaces of a lens. If a line XX be drawn through the two centers $C^1$ and $C^2$, it will intersect the surfaces at $O^1$ and $O^2$. Planes $P^1$ and $P^2$, tangent to the surfaces $S^1$ and $S^2$ at $O^1$ and $O^2$, are perpendicular to the common radius line XX and, therefore, parallel to each other. These planes include within their surfaces a small portion of the curved surfaces $S^1$ and $S^2$ at $O^1$ and $O^2$, so that light passing through these small areas of $S^1$ and $S^2$ passes through parallel surfaces and is not refracted. But if we consider tangent planes $P^3$ and $P^4$ at points $O^3$ and $O^4$ on the surfaces $S^1$ and $S^2$, it will be seen that $P^3$ is perpendicular to a radius $R^1$ to the center $C^1$, while $P^4$ is perpendicular to $R^2$, the radius to the center $C^2$. These two lines are not parallel to each other, hence the planes $P^3$ and $P^4$ are not parallel and light passing through the small areas of $S^1$ and $S^2$ contained in these planes is refracted as through a prism with sides $P^3$ and $P^4$ and an object seen through such a portion of the lens is seen not in its true position but displaced laterally from such a position. This is simply a demonstration of a theory commonly used in the study of lenses and preliminary to a further discussion of the subject.

In Figure 2 is shown a bifocal lens made on the monocentric principle used by the prior art. $S^1$, $S^2$ and $S^3$ are the three curved surfaces of the bifocal. A distinctive feature of this monocentric principle is that the centers $C^1$, $C^2$ and $C^3$ of these surfaces must lie on one and the same straight line as XX and passing through $O^2$, the entrance point of the curves $S^2$ and $S^3$. This line XX is the optical axis of both adjacent lens portions. $P^1$ is a tangent plane at $O^1$ where XX pierces the surface $S^1$. It is perpendicular to XX. $P^2$ is a tangent plane to the surface $S^2$ at the point $O^2$ and lying above line XX. $P^3$ is a tangent plane to the surface $S^3$ at the point $O^2$ and lying below the line XX. $P^2$ and $P^3$ are both perpendicular to line XX and, therefore, both parallel to plane P¹. As these planes are all parallel to each other, the small elements of the surface S¹, S², S³ lying within these tangent planes are all parallel and light passing through these elementary areas is not bent from a straight path and images of objects seen therethrough in either the upper or lower lens appear in the same position as the object itself. This lens then merges the image at the point of entrance.

The workers in the prior art, in constructing lenses of one piece of glass, have considered this monocentric principle as the necessary condition for obtaining the "no jump" effect whereas I have discovered that it is only a special condition of a much broader principle and a condition which, if adhered to, imposes serious limitations on the making of multifocal lenses.

It is made apparent in Figure 2 that with such a construction, a third concave surface with its center on line XX and tangent at the point O² will interfere with and limit to a great extent the visual areas of the other two surfaces. The prior art workers in pursuing this principle have been content to get their third surface with only approximately monocentric conditions. In some cases, the third surface has been of necessity disposed towards the nasal and temporal sides of the lens.

Also the prior art workers have not seen that a merging image lens could be made having three or more separated and distinct fields of vision wherein the dioptric value of the surfaces did not decrease or increase progressively in passing from the weakest to the strongest portion or vice versa. In other words, their intermediate fields are all of intermediate dioptric value.

In Figure 3 is shown a bifocal lens made on my principle. S¹, S² and S³ are the three curved surfaces of the lens. A distinctive feature of my invention is that centers of adjacent surfaces lie in a line, as L² L², through a point E², lying at the intersection of a meridian plane with the line of demarcation between the two surfaces. In the drawings, the meridian plane is the plane of the paper on which they are drawn. P¹ is a plane tangent at E¹ where L² L² pierces the surface S¹. It is perpendicular to the radius line R¹. P² is a plane tangent to the surface S² at the point E². P³ is a plane tangent to the surface S³ at the point E². As the centers C² and C³ both lie in the line L² L², the two planes P² and P³ are parallel, being perpendicular to the same straight line. Neither of these planes is parallel to P¹ but they both have the same angular relationship with P¹. Hence an image of an object seen through the part of the lens at E², bounded by the curved surfaces S¹ and S², appears in the same relative position to the object itself as when seen through a similar portion of the lens at E², bounded by the curved surfaces S¹ and S³. There is, therefore, no further displacement of the image of an object seen through the lens at a point at, immediately above or immediately below the line L² L² and, consequently, the image merges in the two lenticular portions. It is to be noted here that in my lens there is no necessarily fixed relationship whatever existing between the curved surfaces S¹ and the curved surfaces S², S³, etc., so that I am enabled to form a semi-finished lens blank with my principle of construction that may have the opposite curved surface worked upon at will to provide whatever relationship may be desired with reference to the optical center of any one of the lenticular portions of my lens and the geometrical center of the completed and finished lens.

On account of the relationship existing between the centers of adjacent curved surfaces hereinbefore mentioned, I am enabled to go farther than the workers in the prior art, especially in the production of multifocal lenses having more than two lenticular portions because I may separate two such portions by an intermediate portion, which may have contained therein such optical properties as may be prescribed for it, as a major or most commonly used portion, and still have merging of the image when passing from one lenticular portion to another.

Thus in Figure 4, which represents such a semi-finished lens, the convex curve S¹ is indicated in dotted line, as it is a rough unfinished surface having no relation whatever with the finished surfaces S², S³ and S⁴. We will assume S² to be such a surface that in a finished lens it will be the distance portion. S³ will have a stronger focus, say, for reading titles of books on a shelf, while S⁴ is of a still stronger focus for close reading. E¹ and E² are points where the eye normally enters and leaves the various lenticular portions. For the sake of brevity, they will hereafter be called "entrance points." They are considered here as lying in the plane of the paper. The surface S² has its center at C². Through C² and E¹ a line L¹ L¹ is drawn and along this line I take the center C³ and with a radius R³, indicate the surface S³. In like manner, L² L² is drawn through E² and C² and on this line at C⁴ with a radius R⁴ a curve is drawn to indicate the surface S⁴.

The surface S³ is indicated as tangent to and merging with the surface S² at the point E¹, but as its radius of curvature is greater than S², it will cut into the surface of S², as indicated in the perspective view Figure 5.

The surface S⁴ is shown as not tangent with the surface S² at E² but slightly raised therefrom and, preferably, by an amount substantially equal to the amount that said surface $S^4$ will cut into the surface $S^2$ at the deepest point in the finished lens, as also shown in Figure 5.

From the preceding description, it will be seen that I have provided a novel method and a novel lens produced thereby which contains numerous advantages over the methods and lenses of the prior art. For instance, I have provided a method which permits of the making of the multifocal surfaces of a lens to insure merger of the image in passing from one lenticular portion to another and have shown a method of accomplishing this independently of the opposite surface of the lens. This makes possible the production of a one-piece lens with any reasonable number of lenticular portions. It also makes possible the arrangement of such lenticular portions without regard to any sequential order of their dioptric values.

This further makes possible the making of a lens blank, which can be made and sold as an article of trade, wherein the completed lens can be finished so as to give it any optical or prismatic values whatever in one of its portions without disturbing the merger of the image. Thus, the multifocal surface may be constructed to achieve merger of the image while the opposite surface may be constructed to effect the prescribed correction.

It is to be understool from the principles of geometry that surrounding the point where a radius pierces a spherical surface there is an area within which all planes tangent to the sphere are nearly parallel to the tangent plane at the point mentioned. Within such areas in the two surfaces of a lens the eye functions with approximately the same amount of prismatic disturbance as at the center of such area. Hence if in forming an adjacent lenticular surface under the terms of my principle, i. e., with the centers of the two adjacent surfaces lying in the same line, the centers of one of the spherical surfaces be taken adjacent and close to the line, a larger area of approximately the same amount of prismatic disturbance is obtained in one of the portions, than if the center were taken on the line.

This area is inversely proportional to the difference in the radii of curvature of the two adjacent portions, hence inversely proportional to the dioptric value of said portions. Hence I do not wish to be limited in my claims absolutely to a straight line for the locus of the centers of curvature of adjacent lenticular portions when it is evident that for certain conditions a better lens may be produced with the center located slightly to one side of the line indicated as the locus.

Likewise, it is important that my lens can be made light in form without becoming structurally weak, owing to the fact that I raise a portion of one of the lenticular portions to prevent the lens from becoming too thin at the edge and also to minimize the depth of the resultant ridges. It is also important that my invention makes possible the production of larger areas of least prismatic disturbance wherein the eye may function more easily than in any other lenses not so made. When applicant uses the phrase "lenticular portion" or "lenticular field" in his claims, it is understood that this phrase refers to a portion of the lens which is designed to effect a prescribed correction of vision. When a "lenticular surface" is referred to, it is meant that this surface is a part of a portion of the lens designed to effect any prescribed correction of vision.

There are many other features of my invention set forth in various parts of the specification and indicated in the accompanying claims.

Having thus described my invention, what I claim is,—

1. The method of producing a lens from a single piece of material which comprises forming a lenticular surface on one side of the material and then forming another surface thereon such that the two surfaces have coincident radii at the entrance point and finishing the other side with a surface in such relation to the other surfaces that the optical axis of the lens will fall on whatever line is required for the necessary correction.

2. The method of producing a lens from a single piece of material which comprises forming a lenticular surface on one side of the material and then forming another surface such that the two surfaces have coinincident radii at the entrance point and finishing the other side with a surface whose optical axis is displaced relative to the coincident radii to obtain a desired prismatic correction.

3. A semi-finished ophthalmic lens blank formed of a single piece of material having more than two lenticular surfaces with separated entrance points, said surfaces having coincident radii at their entrance points and with one or more of the lenticular surfaces disposed so as to lie partly above and partly below adjacent surfaces.

4. The method of producing a lens from a single piece of material which comprises forming a lenticular surface on one side of the material and then successively forming other surfaces so that only two surfaces abut at any one point while abutting lenticular surfaces have coincident radii at their entrance point.

5. A semi-finished ophthalmic lens blank formed of a single piece of material having more than two lenticular surfaces with separated entrance points, said surfaces having coincident radii at their entrance points.

6. A semi-finished ophthalmic lens blank formed of a single piece of material, having two lenticular surfaces with coincident radii at their entrance point, said surfaces intersecting at two separated points and one of such surfaces being partly above and partly below the other of such surfaces.

7. An ophthalmic lens formed of a single piece of material having a major portion and a minor portion embodying curved surfaces on one side of the lens whose radii are coincident at the entrance point and non-coincident with the optical axis of the major portion.

8. An ophthalmic lens formed of a single piece of material having a major field of vision and a plurality of minor fields of vision embodying curved surfaces having radii substantially coincident at the respective entrance points.

9. An ophthalmic lens formed of a single piece of material having a major field of vision and a plurality of minor fields of vision embodying curved surfaces having radii substantially coincident at the respective entrance points and with one or more of the lenticular surfaces disposed so as to lie partly above and partly below adjacent surfaces.

10. An ophthalmic lens formed of a single piece of material and having a major field of vision and a plurality of minor fields of vision embodying curved surfaces having radii substantially coincident at the respective entrance points and having the optical axis of the major field removed from one or more of the points of entrance.

11. A homogeneous ophthalmic lens having a major and a minor field of vision, embodying curved surfaces having radii at the entrance point, and whose surfaces intersect at two points substantially midway between the entrance point and the periphery of the lens, said surfaces being so disposed that one is partly above and partly below the other.

12. A homogeneous ophthalmic lens having a major and a minor field of vision, embodying curved surfaces having radii at the entrance point, but non-coincident with the optical axis, and whose surfaces intersect at two points substantially midway between the entrance point and the periphery of the lens, said surfaces being so disposed that one is partly above and partly below the other.

13. The method of producing a lens from a single piece of material which comprises forming a lenticular surface on one side of the material and then forming another surface such that two surfaces have coincident radii at the entrance point, one of such surfaces being partly above and partly below the other of such surfaces, and finishing the other side with a surface whose optical axis is displaced relative to the coincident radii to obtain a desired prismatic correction.

14. The method of producing a lens from a single piece of material which comprises forming a lenticular surface on one side of the material and then forming another surface such that the two surfaces have coincident radii at the entrance point, one of such surfaces being partly above and partly below the other of such surfaces, and finishing the other side with a surface whose optical axis is located according to desired correction regardless of whether or not it coincides with the said coincident radii.

15. An ophthalmic lens formed of a single piece of material having a major portion and a minor portion embodying curved surfaces on one side of the lens having radii at the entrance point and non-coincident with the optical axis of the major portion, one of such surfaces being partly above and partly below the other of such surfaces.

16. An ophthalmic lens formed of a single piece of material having a major field of vision and a plurality of minor fields of vision embodying curved surfaces with radii substantially coincident at the respective entrance points, and with one or more of the lenticular surfaces disposed so as to lie partly above and partly below adjacent surfaces.

In testimony whereof I hereby affix my signature.

DANIEL D. HUBBELL.